United States Patent
Marentic et al.

(10) Patent No.: US 6,682,679 B1
(45) Date of Patent: Jan. 27, 2004

(54) PROCESS FOR PROVIDING A DECORATIVE TRANSFER IN A MOLDED PRODUCT

(75) Inventors: Francis J. Marentic, Woodbury, MN (US); Mark J. Marentic, Farmington Hills, MI (US)

(73) Assignee: Intouch Services, Vonore, TN (US)

( * ) Notice: Subject to any disclaimer, the term of this patent is extended or adjusted under 35 U.S.C. 154(b) by 403 days.

(21) Appl. No.: 09/593,594

(22) Filed: Jun. 14, 2000

(51) Int. Cl.$^7$ ............................................. B29C 41/20
(52) U.S. Cl. ....................... 264/247; 264/255; 264/265; 264/275
(58) Field of Search ................. 264/247, 255, 264/265, 275

(56) References Cited

U.S. PATENT DOCUMENTS

| | | | |
|---|---|---|---|
| 3,207,822 A | * 9/1965 | Makowski | 264/509 |
| 4,208,362 A | * 6/1980 | Deichert et al. | 264/1.7 |
| 4,337,289 A | 6/1982 | Reed et al. | 428/195 |
| 4,490,410 A | 12/1984 | Takiyama et al. | 427/44 |
| 4,705,584 A | 11/1987 | Lauchenauer | 156/79 |
| 5,154,959 A | 10/1992 | Dei Rossi | 428/67 |
| 5,498,307 A | * 3/1996 | Stevenson | 156/277 |
| 5,604,006 A | * 2/1997 | Ponchaud et al. | 428/67 |
| 5,695,587 A | 12/1997 | Dumoux | 156/230 |
| 5,830,529 A | 11/1998 | Ross | 427/152 |
| 6,264,782 B1 | 7/2001 | Oshima et al. | 156/237 |

FOREIGN PATENT DOCUMENTS

| | | |
|---|---|---|
| JP | 406255236 | 9/1994 |
| JP | 410157399 | 6/1998 |
| JP | 2000052695 | 2/2000 |

OTHER PUBLICATIONS

"MEK Peroxides", Advanced Plastics Literature.
"Mold Care", Composites One, pp. 12–13.
"Resin Terminology", Advanced Plastics Literature, Composite Fabricators Asociation, product application manuel, Cook Composites and Polymers, 7th edition, p. 10.
"Gel Coats And Enamels", Cook Composites and Polymers, 1995.
"Gel Coats", Advanced Plastics Literature, pp. 15–16, 1990.

* cited by examiner

Primary Examiner—Edmund H. Lee
(74) Attorney, Agent, or Firm—Westman, Champlin & Kelly, P.A.

(57) ABSTRACT

Decorative transfers that can be directly applied to a mold surface during the molding process are created. The decorative transfers include an uppermost intermediate layer that includes a tacky resin. The decorative transfers also include inks that specify a desired image. Tacky inks and/or tack-free inks are used in the decorative transfers. Preferred decorative transfers include crosslinkable polymers in all of the intermediate layers.

13 Claims, 2 Drawing Sheets

PROCESS FOR PROVIDING A DECORATIVE TRANSFER IN A MOLDED PRODUCT

BACKGROUND OF THE INVENTION

The present invention relates to decorative transfers. In particular, the invention relates to decorative transfers that can be applied directly to a mold surface during a molding process.

Decorative transfers are applied to a number of functional objects, for example, boats, cars, planes, showers, and to a variety of decorative objects. Decorative transfers may contain images that are decorative and/or informative.

Commercially available decorative transfers include, for example, water slide transfer decals that are essentially paper backed decals which provide for separation of the decal from the backing paper upon the application of water to the backing paper. The decorative transfers are formed by processes that include die cutting, kiss cutting and premasking to prepare the graphic for application.

The application of decorative transfers to a number of different products can be based on a pressure sensitive adhesive for applying the transfer to the exterior of the molded product. Potential problems with delamination of the transfer after application exist, as well as instability due to chemical reactions between incompatible materials. Water slide transfer decals have also been generated with a tacky adhesive, rather than a pressure sensitive adhesive, on the back of the image that can be placed on a molded product.

SUMMARY OF THE INVENTION

In a first aspect, the present invention pertains to a decorative transfer including a backing and one or more intermediate layers disposed on the inner surface of the backing. The one or more intermediate layers include an ink film and a tacky resin.

In a further aspect, the present invention pertains to a process of providing a decorative transfer. The process includes applying one or more intermediate layers to the inner surface of a backing. The one or more intermediate layers can include an ink and a polymer base that becomes tacky upon drying. The process can also include placing a protective release liner over the one or more intermediate layers when the polymer base becomes tacky.

In another aspect, the invention pertains to a process for providing a decorative transfer in a molded product. The process includes applying a decorative transfer to a mold surface. The decorative transfer includes a backing, one or more intermediate layers including an ink film and a tacky resin. The one or more intermediate layers are disposed on the inner surface of the backing and the tacky resin is contacted with the mold surface.

DETAILED DESCRIPTION OF THE ILLUSTRATIVE EMBODIMENTS

Improved decorative transfers, commonly called "decals", generally are produced with a backing and one or more intermediate layers disposed on the backing. A protective release liner may be placed over the one or more intermediate layers. The one or more intermediate layers include an ink film describing a desired image and a tacky resin in the uppermost layer. Decorative transfers that include only one intermediate layer can also be created by using tacky inks such that the ink film is the uppermost tacky layer. The decorative transfers may also include a protective release liner placed over the tacky resin. Preferably, all of the intermediate layers include polymer bases that are crosslinkable.

The invention also includes methods of incorporating the improved decorative transfers in molded products. The methods include placing the tacky surface of the decorative transfer directly against a mold surface after removal of the protective release liner. Additional layers that include, for example, crosslinkable polymer bases with a catalyst and reinforcing substrates may be applied over the decorative transfer on the mold surface to form the molded product. After the product is completed, the ink film is embedded in the molded product with the image visible from the surface. All of the crosslinkable polymer bases on the mold surface, preferably, are allowed to crosslink prior to removal of the molded product from the mold surface.

The molded products of this invention include an outer crosslinked polymer layer. In some embodiments, the image of a decorative transfer is covered by and visible through an outer layer of crosslinked polymers derived from a clear gel coat. In other embodiments, where tacky inks are used to create the image of the decorative transfer, the crosslinked outer polymer layer is derived from the crosslinking of the polymer base of the inks.

The molded products generally also include a color gel coat layer and a molded structure that comprises substrates and crosslinked resin. The polymer bases in all of the layers preferably have been co-crosslinked in the molded products described herein.

The first intermediate layer is the layer directly on the inner surface of the backing. The uppermost intermediate layer is the layer that is closest to the protective release liner. In embodiments with only one intermediate layer, the first intermediate layer is the uppermost intermediate layer. "Tacky resin", as referred to herein is a gel coat with a polymer base that dries tacky. Tacky resins have essentially pressure-sensitive adhesive characteristics and have sufficient tackiness to adhere the decorative transfer to a mold surface. "Tack-free resin", as referred to herein is a gel coat with a polymer base that dries substantially tack-free and does not have adhesive-like characteristics.

"Tacky inks", as referred to herein, are inks that include a tacky resin and, thus, are tacky when dry. "Tack-free inks", as referred to herein, are inks that include a tack-free resin.

The decorative transfers described herein include a backing having an inner surface. The backing generally serves to receive one or more intermediate layers. One of the intermediate layers includes an ink film forming a desired image. The uppermost intermediate layer generally includes a tacky resin.

The intermediate layers generally do not include a catalyst. The crosslinkable polymer bases of the intermediate layers can be crosslinked during the molding process. Additional resins that include catalysts can be placed over the intermediate layers during the molding process. The catalyst in these resins can crosslink the polymer bases of the intermediate layers.

The intermediate layers applied to the backing preferably include polymer bases that are chemically compatible, and more preferably equivalent. By "compatible", it is meant that the polymers in the specified layers, upon crosslinking, form a band that is seamless to visual observation.

The decorative transfer can include one intermediate layer if the intermediate layer is created using tacky inks. The intermediate layer, thus, includes both an ink film and also a tacky resin to form a tacky ink film as a single layer. A protective release liner can then be placed over the tacky ink film to protect the tacky surface before use.

In some embodiments, two intermediate layers can be placed on the inner surface of the backing. The outer or uppermost layer is necessarily tacky to provide for application of the transfer to a mold surface. The first layer, preferably, includes a substantially tack-free resin when dry. The second layer, and in this embodiment the uppermost layer, can be placed over the first layer and preferably includes a tacky resin, for example, a marine clear gel coat. A protective release liner can be-placed over the second layer after the second layer has become tacky.

An ink film can be included in the tacky outer layer and/or included in a substantially tackfree inner layer. The ink film generally specifies a desired image and preferably includes a crosslinkable polymer base. The ink film can include a single ink layer. Alternatively, the ink film can include a plurality of ink layers placed on top of each other to create a desired image.

Thus, in some preferred embodiments, a first intermediate layer is an ink film that is substantially tack-free. The ink film intermediate layer is adjacent to a second intermediate layer that is a tacky clear gel coat layer. By "clear" it is meant that the resin or gel coat is transparent such that an image covered by the clear gel coat layer is substantially visible through the clear gel coat. In other preferred embodiments, the first layer can include a substantially tack-free resin, for example, a color gel coat. The second layer, and in these embodiments the uppermost layer, can include a tacky ink film. In either of the embodiments, a protective release liner can generally be placed over the tacky resin. A tackfree first intermediate layer can be advantagous during the molding process.

Decorative transfers with other types of intermediate layers and/or with more than two layers are also contemplated. Generally, decorative transfers with more than two intermediate layers include an uppermost intermediate layer that includes a tacky resin and preferably, a first layer that includes a tack-free resin.

The decorative transfers described herein can be used in improved methods of incorporating an image into a molded product. The improved methods include removing the protective release liner from the decorative transfer to expose the tacky resin of the decorative transfer. The tacky resin of the decorative transfer can be placed directly against the mold surface. The mold surface may, optionally, be coated with a mold release agent prior to application of the tacky resin of the decorative transfer. The backing of the decorative transfer can be removed after the tacky resin has adhered the decorative transfer to the mold surface.

After removing the backing, a color gel coat layer can be applied onto the mold surface and over the intermediate layers of the decorative transfer. The color gel coat preferably includes a catalyst. A molded structure can be formed further by applying, over the color gel coat, one or more substrates such as fiberglass mats along with a crosslinkable support resin. Preferably, a plurality of substrates are layered with a crosslinkable support resin between each layer. Crosslinking of the various polymers on the mold surface concurrently will be referred to herein as co-crosslinking. Co-crosslinking of the polymer bases in the intermediate layers, the color gel coat and the support resin of the molded structure can result in molded products with a monolithic structure. The image of the decorative transfer can be embedded in the molded product. In some embodiments, the image is embedded between crosslinked polymers and protected by clear outer crosslinked polymers. In other embodiments, the crosslinked polymers of the image are the outer crosslinked polymers.

The backing is used to provide a surface to create the image and to transport the image or decorative design to its desired location. Images can be created on the backing with inks using a variety of techniques. Tack-free inks, for example, may be spray coated, screen printed and the like. Tacky inks, preferably, are precision coated onto the backing as described below.

The intermediate layers of the decorative transfers can be firmly attached to the backing until a release agent is applied. In embodiments using water slide liners as backing, the intermediate layers generally will not release until water is applied to the backing. Water dissolves a water soluble coating on the backing allowing the intermediate layers to transfer off the backing. Since the intermediate layers are applied to the mold prior to the formation of the product, no adhesive is required between the backing and the image.

The images on decorative transfers can be incorporated into molded products, i.e. boats, snowmobiles, jet skis and bathtubs, using the processes described herein. Suitable molded products can be any products that are made by the use of a mold surface as a tool to apply a number of polymers and substrates. The images on the decorative transfers can become part of the molded product. The images are not prone to delamination and are protected over prolonged use of the molded product.

A. Decorative Transfer

The decorative transfer includes a backing having an inner surface on which one or more intermediate layers can be applied. A variety of backings are known in the art and are suitable for use for the decorative transfers described herein. Generally, desirable backings can be selected such that separation of the backing from the intermediate layer/s does not result in perceivable distortion of the image. Suitable backings can include water release backings, such as a water slide liner, silicone treated paper, silicone treated plastic and the like.

Water release transfer papers, called water slide papers, are disclosed in U.S. Pat. No. 4,337,289 to Reed entitled "Water release transfer". A process that affixes a decorative pattern to a sticky molded component is shown in U.S. Pat. No. 4,490,410 to Takiyama et al. entitled "Method of affixing a decorative pattern to a stock or a molded component". It involves irradiating the resin of the molded component with the decorative pattern to cure the resin. After the resin is cured, the backing of the decorative pattern is separated from the image.

Generally speaking, it is convenient to apply the image to a water release backing that generally includes a water permeable paper coated with a water soluble polymer, natural or synthetic, such as dextrin. In these embodiments, when water is applied to the backing, the water permeates the water permeable paper and dissolves the dextrin. Intermediate layers including the image, thus, are separated from the backing paper when the dextrin is solubilized. It will be appreciated that other types of flexible substrates and water-release coatings of other kinds may be used as alternatives. In preferred embodiments, the backing is a water release backing paper.

One or more intermediate layers can be deposited on the backing. The one or more intermediate layers deposited on the backing can include an ink film exhibiting a desired image and a tacky resin. The ink film and the tacky resin can be in separate intermediate layers. Alternatively, the ink film and the tacky resin can be in the same intermediate layer.

The inks used to create the desired images in the decorative transfers described herein can be tack-free inks. Alternatively, the inks may also be tacky inks. Both tack-free inks and tacky inks can be used to create the desired images on the decorative transfers. The tackiness of the inks in part can influence the desired presence and type of additional intermediate layers used to create the decorative transfers.

As described above, the uppermost intermediate layer on the decorative transfer generally includes a tacky resin. In embodiments where the image is created using tack-free inks, an intermediate layer that includes a tacky resin is preferably placed on top of the ink film layer. More preferably, the intermediate layer placed on top of the ink film is a tacky clear gel coat.

In embodiments where the images are created using tacky inks, only one intermediate layer may be placed between the backing and the protective release liner. The intermediate layer created using tacky inks can include both the ink film and the tacky resin. Generally, pigments, in appropriate amounts, can be added to a tacky resin as described below to generate tacky inks. A protective release liner can be placed directly on the ink film.

In preferred embodiments using tacky inks, a first intermediate layer includes a tack-free resin, e.g. a color gel coat layer described below. A second intermediate layer that includes an ink film created from the tacky inks can be placed over the tack-free gel coat. The protective release liner can then be placed over the second intermediate layer that is tacky.

Figure 1:
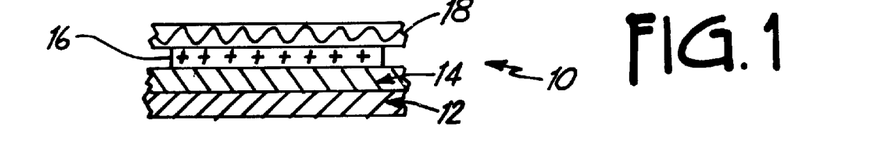
FIG. 1 is a cross-sectional view of a decorative transfer with a backing, two intermediate layers and a protective release liner.

In one illustrated embodiment, shown in FIG. 1, a decorative transfer indicated generally at 10 includes a backing 12 on which an ink film represented as a first intermediate layer 14 is applied on the inner surface of the backing 12. The ink film forms the desired image. The image is, preferably, created with inks that include crosslinkable polymer bases. The decorative transfer includes a second intermediate layer 16. The second intermediate layer 16 includes a tacky resin and preferably is a tacky, clear gel coat layer.

The polymer bases of the inks are preferably compatible with the polymer base of the clear gel coat layer. A protective release liner 18 is disposed over the second intermediate layer.

Figure 2:
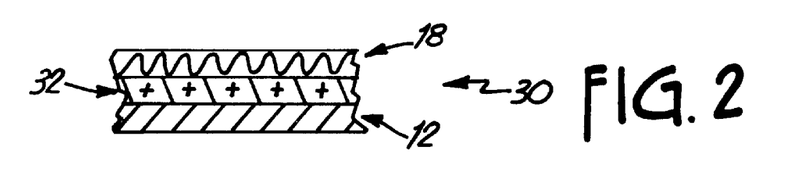
FIG. 2 is a cross-sectional view of a decorative transfer with a backing, one intermediate layer and a protective release liner.

FIG. 2 illustrates another embodiment of a decorative transfer in which only one intermediate layer is used. In FIG. 2, decorative transfer 30 includes a backing 12 on which an intermediate layer 32 is applied to the inner surface. The intermediate layer 32 includes ink film that generates the desired image and a tacky resin, i.e. intermediate layer 32 is tacky when dried. A protective release liner 18 can be placed directly on the intermediate layer 32.

The intermediate layers placed on the backing generally do not include a catalyst. The tackiness of the resin, if present, is generally acquired by drying of the resins. The polymer bases of the intermediate layer are generally exposed to a catalyst during the molding process, i.e. after the decorative transfer has been placed on the mold surface.

As described above, the ink film specifying the image in the decorative transfer can be created using a variety of inks described herein. These include tack-free inks and tacky inks. Suitable inks are described further in U.S. patent application Ser. No. 09/563,137, incorporated herein by reference. Suitable inks, preferably, include polymers that can be crosslinked upon exposure to a catalyst.

The image may also be created using inks that are not crosslinkable. These inks include vinyl process inks, acrylic process inks, lacquers and the like. It will be understood that the image layer of the decorative transfer can be created using any of the inks generally known for silk screening methods. Preferably, a tacky clear gel coat is placed over the ink film layer in embodiments using non-crosslinkable inks. In other words, the decorative transfer can include the non-crosslinkable ink film as the first intermediate layer and the tacky clear gel coat as the second intermediate layer.

The inks can include a polymer base, pigments, and solvents. The inks may, optionally, include gelling agents to control viscosity, flow agents, ultra violet light absorbers, tack reducers and other suitable compounds.

The polymer base of the inks can include polyester resins, preferably unsaturated polyester resins for crosslinkable inks. Polyester resins can include ortho resins, iso resins, bisphenol A fumarates, chlorendics and vinyl esters. Polyesters generally are formed by the reaction between polyfuctional acids/anhydrides and polyhydroxyl alcohols and preferably between difunctional carboxylic acids/anhydrides and dihydroxy alcohols. In unsaturated polyester resins, one of the reactants, either a difunctional acid and/or a dihydroxyl alcohol is generally unsaturated to allow for crosslinking to occur. Particularly useful molecules for introducing unsaturation sites into a polymer backbone can be, for example, maleic acid, maleic anhydride and fumaric acid. Maleic anhydride is generally preferable in the synthesis of unsaturated polyester due to its low cost.

Ink polymer bases with unsaturated polyesters generally contain an unsaturated acid and/or unsaturated anhydride, for example, maleic acid and/or maleic anhydride. A dihydroxyl alcohol, for example, a glycol, that joins the acids together is generally incorporated into the polyester. Suitable glycols include for example, ethylene glycol, propylene glycol, diethylene glycol, dipropylene glycol, NeoPentyl Glycol (NPG) and the like.

Polymer bases of unsaturated polyester inks may also contain a secondary, i.e., additional, saturated difunctional acid, for example, orthophthalic acid, isophthalic acid, adipic acid, succinic acid and/or succinic anhydride, other saturated acids and anhydrides thereof. A secondary saturated acid is generally included in the polymer base in order to reduce the crosslinking and rigidity relative to an all unsaturated acid polymer base.

A number of suitable resins that include unsaturated polyester resins with a saturated secondary acid are commercially available and include, for example, LOVOCOR® gel coat 962 series-Sanitary, LOVOCOR® gel coat 963 series-Marine, LOVOCOR® gel coat 964 series-Transportation that can be purchased from Cook Composites and Polymers (CCP), Kansas City, Mo. The commercially available unsaturated polyester resins are generally referred to by the type of the saturated acid that is included in the resin since generally all of the unsaturated polyester resins include maleic acid and/or maleic anhydride moieties. An isophthalic resin obtained from CCP, for example, includes a polyester formed from maleic anhydride moieties, isopthalic acid moieties and a glycol. Suitable inks include, for example, orthophthalic resins, isophthalic resins, and dicyclopentadiene (DCPD) resins. Vinyl ester resins may also be suitable. Preferably, the inks include a maleic acid/isopthalic polymer base, and more preferably a maleic acid/isopthalic/neopentyl glycol polymer base.

Inks comprising vinyl esters may also be suitable. Vinyl esters can be prepared by reacting a monofunctional unsaturated acid such as methacrylic acid or acrylic acid with a bisphenol diepoxide. The resulting polymer which contains unsaturated sites only in the terminal positions is mixed with an unsaturated monomer such as styrene.

The inks with the desired polymer base resins may be clear, white, black and/or contain any number of other color pigments. These inks can be tackfree and may be used in a desired manner to generate the desired images. Desirable inks contain pigments that are light stable, i.e. do not yellow after prolonged exposure to ultraviolet light. The selection of the color pigments in the ink is based on the desired image to be created on the decorative transfer. A number of colored resins with suitable polymer bases are commercially available. If the desired color of the ink is not commercially available, one or more inks may be combined to achieve other desired colors. Color matching as known in the art may be performed using the commercially available ink colors. Additional pigments can be added to the polymer base resins as desired.

Alternatively, the desired ink colors may be obtained by adding ink pigments to a neutral or a clear gel coat. The ink pigments may be in a powdered form or a liquid form. A liquid form of ink pigments include water based pigments that can be mixed into a desired gel coat.

In embodiments where a metallic color is desired, a clear or neutral gel coat may be used and metallic powders can be blended into the gel coat to achieve the desired effect. Metallic powders that can be blended into the gel coats include, for example, aluminum, copper and the like. A pearlescent pigment may also be blended into the gel coats.

The inks can also include agents that affect the viscosity of the ink. Gelling agents that increase the viscosity of the ink may be included in the commercial polymer base resins or added to commercial polymer base resins to obtain a desired viscosity., Gelling agents can include, for example, a fumed silica, such as Cab-O-Sil purchased from Cabot Corporation, Tuscola, Ill.

Solvents are generally included in the inks. Solvents can aid in the suspension and/or solubilization of the ink components. Additional solvents that "thin" the inks, referred to herein as thinning solvents, may be added to commercial polymer base resins to obtain an ink with a desired viscosity, dry time and/or flow characteristics. Increasing the amount of solvents in the inks generally decreases the viscosity of the ink and thus, affects the flowability of the ink.

Suitable thinning solvents can also be selected based on their evaporative characteristics. In screenprinting, for example, thinning solvents that evaporate relatively slowly, are added to the ink in order to reduce drying in the screen. Suitable thinning solvents that can be included in the inks include, for example, ketones such as cyclohexanone, isopherone, butrolactone and combinations thereof. The thinning solvent is preferably 9630 polyester thinner purchased from Nazdar Company, Inc., Shawnee, Kans. that includes petroleum distillate, cyclohexanone, butrolactone and napthalene. Addition of a thinning solvent may not be necessary if drying of the ink during image creation is not an issue. The desirable amount and type of thinning solvent can vary and may depend on the technique used for creating the image on a backing and the desired time of drying the image on the backing. Preferably, about 3 percent by weight to about 15 percent by weight of the thinning solvent is added to the inks and more preferably from about 5 percent by weight to about 10 percent by weight of the thinning solvent is added to the inks for silk screening methods.

The solvents included in the ink generally evaporate, in a reasonable period of time, to produce a dry image or tacky image after the ink has been applied to the backing. The solvents generally evaporate to produce a dry image or a tacky image by about ten minutes to about 2 hours when air dried at room temperature, preferably between about 15 minutes and about 60 minutes, and more preferably between about 20 minutes and about 40 minutes. The drying time may be decreased by drying, for example, in an oven at an elevated temperature. The decorative transfer with the image may be dried, for example, at about 150° F.–200° F. In order to facilitate faster drying times, additional protocols generally known in the art can be used to dry the images and include exposing the image to heat, to a fan and the like.

The inks may include silicone flow agents that affect the flowability of the ink. Suitable silicone flow agents include, for example, ML-520 flow promoter purchased from Cudner & O'Connor Co. Chicago, Ill. The inks may also include ultraviolet light absorbers that can better protect the image against degradation caused by exposure to sunlight. Suitable ultraviolet light absorbers include, for example, Cyasorb UV-531, UV-24, UV-9 benzophenone absorbers and Cyasorb UV-5411 benzotriazole absorber that can be purchased from American Cyanamid Co. Newark, N.J.

The tackiness of the inks may be determined by the amount of tack reducers included in the resin. A variety of compounds can reduce the tackiness of a resin. Preferred polymers for forming the intermediate layers are inherently tacky without the addition of tack reducers. Tack reducers include, for example, pigments, fillers and the like. Ink resins generally contain some tack reducers. These can include, for example, titanium dioxide, hydrous magnesium silicate (talc), amorphous silica gel, methacrylates and combinations thereof. The desirable amount of tack reducers in ink can, thus, be determined by the desired tackiness of the inks. Tacky layers generally are sufficiently tacky such that the decorative transfer stays in place on the mold wall when it is placed there following the removal of any protective release liner.

Tack-free inks generally include tack reducers. Generally, the tackiness of the inks decreases with increasing amounts of tack reducers. Preferably, tack-free inks include at least about 10 percent by weight of tack reducers. More preferably, the tack-free inks include between at least about 20 percent by weight and 40 percent by weight of tack reducers.

Tack-free inks may be obtained, for example, from Cook Composites and Polymers (CCP), Kansas City, Mo. These include, for example, the 953 WJ 300 series ink resins obtained from CCP. Alternatively, tack-free inks may be obtained by purchasing a gel coat that has a tack-free resin, for example, a neutral clear gel coat purchased from Squiggle Tool Co., Maple Grove, Minn. The neutral clear gel coat includes a number of tack reducers and thus, dries without tackiness. To the neutral clear gel coat, desired ink pigments can be added and combined.

Tacky inks generally include the polymer bases and a solvent, for example, styrene. Tacky inks preferably include less than about 20 percent by weight of tack reducers. Tacky inks, more preferably include between about 1 percent by weight and about 15 percent by weight of tack reducers.

Tacky inks may be obtained by purchasing a gel coat that has a tacky resin, for example, a marine clear gel coat purchased from CCP, Kansas City, Mo. To the marine clear gel coat, desired ink pigments can be added and combined to generate tacky inks. Example 2 described below illustrates one embodiment of making tacky inks.

In order to create the ink film that describes a desired image, a number of techniques may be used. These techniques include screenprinting, spray painting, air-brushing, precision coating and the like. Printing techniques can be conventional and include, for example, screenprinting the images onto the inner surface of the backing. Printing on water slide release carrier is disclosed in U.S. Pat. No. 4,337,289 to Reed entitled "Water Release Transfer," which is incorporated herein by reference.

Printing using crosslinkable inks is described in U.S. application Ser. No. 09/563,137, incorporated herein by reference. Preferably, the images are screenprinted using the inks described above. More preferably, inks used in screenprinting include the tack-free inks. The viscosity of the inks can be adjusted to obtain the desired flow properties for use in screenprinting. Tack-free inks can be obtained from CCP, Kansas City, Mo. and additional thinning solvent and silicone were added to obtain an ink with the desired flow properties and drying time for screenprinting. Advantages of screenprinting images include higher efficiency, complex image production, sharper images and the like. The image layers can have a selected thickness. In screenprinting, the thickness of the image can be controlled by the screen mesh size and also by ink characteristics. The thickness of the image layer is preferably between about 5 microns to about 25 microns and more preferably the thickness of the image layer is between about 10 microns and about 20 microns.

The image may form a continuous ink film so the individual portions of the image will remain together. If a background layer is printed in place, the thin background film of ink will be transferred along with design or words that are overprinted. The transferable ink film on the backing may include one or more clear, or solid colored compatible ink layers. In the case where a plurality of ink layers are superimposed to form a composite design, the inks are applied sequentially and each layer is subjected to a degree of drying to the extent necessary to accept overprinting without picking or smudging before application of the succeeding layers. It is preferable to fully dry each of the ink layers of the ink film before applying the successive ink layer.

When the ink film includes a plurality of ink layers to form the desired image, the inks are, preferably, tack-free inks. In some embodiments, the uppermost ink layer of the ink film may be created using tacky inks.

Multi-ink layer images usually consist of one or more colored design layers printed as an ink film. Both single-layer and multi-layer printing on the backing result in the overall ink film that remains intact so a tacky resin intermediate layer or a protective release liner may be placed over the ink film.

In embodiments using tacky inks, the images are preferably precision coated onto the backing. Precision coating is known in the art and generally involves the use of a knife coating device to apply resin at a specific thickness on to a backing. Precision coating can be used to create a resin thickness of between about 0.001 inches and about 0.025 inches. Precision coating may also be used to create resin thicknesses of greater than about 0.025 inches. The use of tacky inks is preferable for creating blocks of color on the decorative transfer, for example, stripes.

In embodiments using tack-free inks, a tacky clear gel coat can be deposited over the ink film. The first intermediate layer of the decorative transfer can be the tack-free ink film and the second intermediate layer can be a tacky clear gel coat.

The tacky clear gel coat to be applied over the ink film can be selected from a variety of commercially available gel coats that provide water and fade resistance when in use, as well as blister resistance.

The tacky clear gel coat can include polymers such as polyester resins, preferably unsaturated polyester resins. The tacky clear gel coat can include a variety of crosslinkable polymer resins. The tacky clear gel coat can include any of the polymer bases described above for the inks. The tacky clear gel coat preferably includes the polymer base and the solvent, for example, styrene. The tacky clear gel coat preferably has less than about ten percent by weight of tack reducers, and more preferably between about 2 percent by weight and about 7 percent by weight of tack reducers. Even more preferable is tacky clear gel coat with less than about 1 percent by weight of tack reducers. The tacky clear gel coat can be, for example, the marine clear gel coat purchased from CCP, Kansas City, Mo.

The tacky clear gel coat may be applied to the decorative transfer using a variety of techniques including spraying the tacky clear gel coat, applying with an implement such as a brush, a doctor blade and the like. The tacky clear gel coat can be applied and built up to obtain the desired depth. The desired depth of the clear gel coat can vary based on the molded product and its use. The clear gel coat preferably is applied to a depth of between about 0.008 inches and about 0.015 inches, more preferably between about 0.010 inches and about 0.012 inches.

In some embodiments of decorative transfers with tacky inks, a tack-free gel coat layer may, optionally, be placed as the first intermediate layer prior to depositing the tacky ink film. The tack-free gel coat layer can be, for example, a color gel coat layer described below without any added catalyst. The tack-free gel coat layer, without added catalyst, can be placed on the inner surface of the backing. The tack-free gel coat layer may be deposited on the backing using any of the techniques described above for clear gel coat layer and/or inks. After the tack-free gel coat layer is substantially dry, the tacky ink can be deposited over the tack-free gel coat layer.

In other embodiments, the decorative transfer can include only one intermediate layer. The intermediate layer includes a tacky ink film. The use of only tacky layer leads to a tacky layer when the backing is removed. Application of additional layers, i.e. color gel coat layer, over the tacky layer during the molding process may be not be smooth. This may result in distortion of the ink film and thus, distortion of the image.

When the uppermost layer of the decorative transfer is dry and has acquired the desired tackiness, a protective release liner can be placed over the tacky surface. The protective release liner is preferably placed when slight thumb pressure against the tacky clear gel coat does not leave a fingerprint, and the clear outer gel coat does not stick to the finger. In the tacky state, the clear gel coat has essentially pressure-sensitive adhesive characteristics and will cause the ink film to adhere to the clear gel coat and also not slip when additional materials are applied against the ink film during the molding process. The tacky surface generally grips the ink film of the image layer. Protective release liners are known in the art and can be purchased, for example, from Flexcon Materials, Spencer, Mass. Protective release liners can be made from, for example, mylar with silicone release, polypropylene with silicone release and the like.

With the protective release liner in place, the decorative transfers can be stacked and/or stored for future use. The decorative transfer may be sold with or without individual wrapping. The decorative transfer preferably is stored away from heat, direct sunlight, high humidity or other conditions that may deteriorate the quality of the image and/or the decorative transfer. Alternatively, the decorative transfer can be immediately applied to the mold surface.

The decorative transfers may also be further processed by die cutting, kiss cutting, weeding and the like. The decorative transfer can be die cut, for example, to obtain individual free-standing letters, i.e. discontinuous letters. Parts of the intermediate layers from the decorative transfer may be removed to obtain the desired configuration of the letters and spacing. A premask sheet having an adhesive on the inner surface may be placed on the backing of the die cut letters to retain the letters in place.

B. Application of Decorative Transfer

The decorative transfers described above are preferably used for placement of images within a molded product. The methods described here are particularly advantageous because of the more efficient manner in which the image is incorporated into a molded product. The protective release liner can be removed from the decorative transfer. The tacky surface, now exposed, can be placed against the mold surface. The backing of the decorative transfer is removed leaving the intermediate layers on the mold surface. A color gel coat and a molded structure can be formed over the intermediate layer and/or layers prior to crosslinking. All of the polymer bases on the mold surface can be crosslinked by a catalyst included in the color gel coat and the resin of the molded structure. Co-crosslinking of the polymers applied to the mold surface results in a molded product with a durable image. In some embodiments, the image is embedded between crosslinked polymers and protected by a clear, durable crosslinked material.

To form a molded product with a decorative transfer, the decorative transfer, with the protective release liner removed, is placed on the mold surface. In preferred embodiments, the tacky surface of the decorative transfer is applied to the section of the mold surface that is to receive the image.

Figure 3:
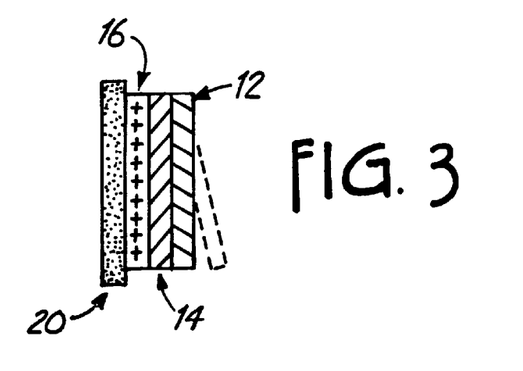
FIG. 3 is a cross-sectional view of a typical mold with a decorative transfer of FIG. 1.
Figure 4:
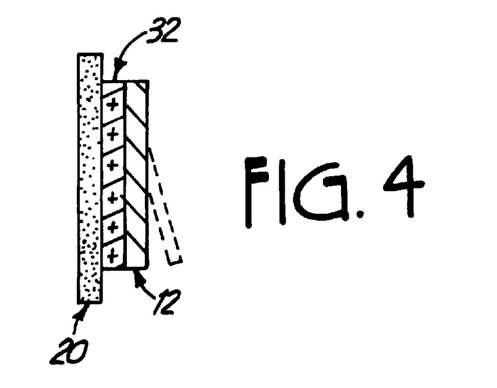
FIG. 4 is a cross-sectional view of a typical mold with a decorative transfer of FIG. 2.

Application of decorative transfers 10 and 30 to a mold surface are illustrated in FIG. 3 and in FIG. 4, respectively. In FIG. 2 and FIG. 3, a mold is illustrated in cross section at 20. The mold can be made of any desired materials, for example, metals such as steel and aluminum, fiberglass, polyester, epoxy, silicone and the like. The mold 20 is shaped to the desired configuration for the finished product, such as a boat hull. To apply decorative transfer 10 to the mold surface, the protective release liner 18 is removed. The second intermediate layer 16 with the tacky resin is placed against the mold surface as shown in FIG. 3. There generally is a conventional mold release coating on the mold surface. After the decorative transfer 10, is in place on mold 20, the backing 12 can be removed. The removal of the backing is represented schematically in FIG. 3 in dashed lines as being lifted off first intermediate layer 14.

In FIG. 4, intermediate layer 32 of decorative transfer 30, after removal of protective release liner 18, is placed against the mold surface 20. When layer 32 is in place, the backing 12 is removed as described above.

The mold surface may be prepared for the application of the tacky surface of the decorative transfer in a suitable fashion including the application of a mold release agent such as a wax. Suitable mold release agents include, for example, Hi-Low 1000™ release wax in paste or liquid, Supreme™ mold release and Honey wax mold release obtained from Composite One, Arlington Heights, Ill.

Once the tacky surface of the decorative transfer is adhered to the mold surface, the backing of the decorative transfer can be removed. Preferably, the backing is removed shortly before proceeding with the additional steps in the molding process. Methods for removing the backing from the decorative transfer can vary depending on the type of backing used. The backing is preferably removed with little or no perceivable distortion of the image. In embodiments with a water slide release liner backing, the backing can be removed by applying water to penetrate the paper backing and release the intermediate layers onto the mold surface.

In embodiments where the decorative transfer was further processed, for example, by die-cutting, the protective liner can be removed and the decorative transfer can be applied to the mold surface. The premask sheet can then be removed by peeling to expose the backing of the decorative transfer. The backing can then be removed as described above.

Additional crosslinkable polymers are preferably applied over the intermediate layers after removal of the backing. In preferred embodiments, a color gel coat is applied over the intermediate layers and the remaining mold surface. The color gel coat generally determines the color of the molded product and may determine the background color of the image. The color of the color gel coat is thus, selected based on the desired background color of the molded product.

In embodiments where a color gel coat was applied as a first intermediate layer on the decorative transfer, an additional color gel coat may not be necessary over the area of the mold surface that received the decorative transfer.

In some embodiments, only one color gel coat may be applied over the entire mold surface including the section of the mold surface with the adhered image. In other embodiments, a plurality of color gel coats may be used. If using a plurality of color gel coats, the color gel coats may be applied adjacent to each other and/or in layers over each other. Different color gel coats, for example, may be applied to different areas of the molded surface to obtain a molded product with a variety of background colors. If two or more color gel coats are applied, each of the color gel coats is generally applied sequentially but prior to complete crosslinking of any of the polymers.

The polymer base of the color gel coat layers is generally compatible with the polymer bases of the intermediate layers. The color gel coat can include any of the polymer bases, solvents and other compounds described above for the intermediate layers. The color gel coats preferably also includes one or more pigments, metallic powders and the like. Thus, color gel coats as described herein can be any of the gel coats described above with the addition of compounds that produce the desired color, including, for example, white. While a colored pigment is generally desired in the color gel coat, the color gel coat can be clear, if desired. A color gel coat is preferably tack-free.

A catalyst is generally added to the color gel coat prior to application over the image and/or the mold surface. Suitable catalysts for crosslinking the color gel coat are commercially available. Catalysts can be purchased, for example, from Advanced Plastics, Nashville, Tenn. Suitable catalysts include organic peroxides, for example, methyl ethyl ketone peroxide and benzoyl peroxide. In preferred embodiments, the catalyst is methyl ethyl ketone peroxide. The catalysts can be added to the color gel coat at a concentration of between about 1.0 percent by weight and about 6.0 percent by weight of the gel coat and preferably between about 2.0 percent by weight of the gel coat and about 5.0 percent by weight of the gel coat.

The amount of catalyst may be adjusted depending on the ambient temperature and/or humidity. As the temperature and/or humidity increases the amount of catalyst added may be lower. Conversely, as the temperature and/or humidity decreases the amount of catalyst added may be higher.

The amount of catalyst may also be adjusted depending on the number of intermediate layers and the thickness of the intermediate layers. Higher amounts of catalyst may be included for increasing amounts of crosslinkable resin derived from the decorative transfer.

The color gel coats may be applied by any of the methods described above for the clear gel coat. The color gel coats are generally sprayed onto the mold surface.

The color gel coats can generally have any desired thickness. In some embodiments, the color gel coats have a thickness of between about 0.015 inches and about 0.125 inches, preferably between about 0.030 inches and about 0.065 inches.

In principle, the color gel coat could be applied at a sufficient thickness to produce the final molded product. However, a molded structure is generally formed on the mold surface over the color gel coat prior to complete crosslinking of the polymers already present on mold surface. The molded structure can include one or more reinforcing substrates and a crosslinkable support resin. The molded structure is generally formed by layering reinforcing substrates and the crosslinkable support resin, preferably in an alternating fashion. A reinforcing substrate, for example, may be placed over the color gel coat, then the support resin, followed by another substrate, then additional support resin and so on until the desired structure is formed.

Reinforcing substrates for forming the molded structure described herein can include a variety of materials. Suitable reinforcing substrates include, for example, fiberglass, carbon fiber, kevlar, foam, balsa wood, angelhair and the like. The substrates are generally in the form of a mat, a weave and the like such that the support resin penetrates through the substrate. To form the molded structure, only one type of substrate may be used throughout the molded structure. Alternatively, a combination of substrates may be used in forming the molded structure.

The crosslinkable support resin is generally used as a "wetting compound" to hold the substrates down onto the mold surface and also to ultimately provide a network of crosslinked polymers within and around the substrates. Upon crosslinking, the combination of the support resin and the substrates form a durable, resilient structure that is suitable for the functioning of the molded products described herein.

The crosslinkable support resin can include a variety of suitable crosslinkable polymers. Preferable crosslinkable support resins can include any of the polymers or combination of polymers described above for the clear gel coat and the color gel coat. The support resin may be clear. Alternatively, the support resin may be tinted by the addition of a tint additive.

A catalyst is generally added to the support resin prior to use. Preferably, the catalyst in the support resin is the same as the catalyst in the color gel coat. The support resin, however, may have a catalyst that is different from the color gel coat.

The specific type of substrates, the number of substrate layers, and the application of the support resin is referred to as a lamination schedule. The lamination schedule is generally determined by the end use of the molded product. In example 3 below, multiple layers of glass mat were used as the substrate along with a catalyzed polyester resin until the desired thickness was generated.

The substrates and the support resin are generally applied prior to complete crosslinking of the other polymers on the mold surface. After application of all the substrates and the support resin, the outermost, exposed surface is preferably smoothed. The exposed surface may be smoothed, for example, using brushes, squeegees, steel rollers, plastic rollers and the like. In embodiments using a close mold process, a second mold surface may be contacted with the outermost surface of the molded structure prior to complete crosslinking. Crosslinking will start once polymer and catalyst are mixed. But the process is set up to take some time to complete. It is complete crosslinking that is avoided since adjacent layers then will not bind.

Figures 5, 6:
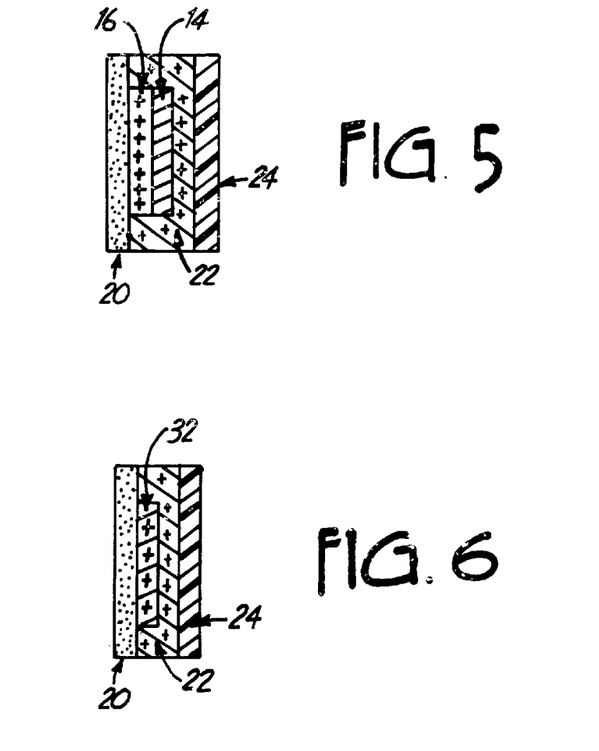
FIG. 5 is a cross-sectional view of a typical mold with the intermediate layers of the decorative transfer of FIG. 1, a color gel coat layer and molded structure applied to the mold surface.
FIG. 6 is a cross-sectional view of a typical mold with the intermediate layer of FIG. 2, a color gel coat layer and molded structure applied to the mold surface.

In some embodiments, as illustrated in FIG. 5 and FIG. 6, after the backing 12 has been removed from decorative transfers 10 and 20, respectively, a catalyzed color gel coat 22 can be applied. Catalyzed gel coats as referred to herein are gel coats with catalyst that have not yet become fully crosslinked. The color gel coat is also generally applied to the areas of the mold surface that do not contain the intermediate layers from the decorative transfer. The color gel coat generally has a polymer base that is compatible, preferably equivalent, with the polymer base of the intermediate layers. Molded structure 24 is generally formed over the color gel coat. The molded structure includes one or more layers of substrates such as fiberglass and carbon fibers, interspersed with crosslinkable support resin, as described above.

In the molded product, the polymer bases of the intermediate layers, the color gel coat and the support resin are preferably compatible, and more preferably include equivalent crosslinkable polymers. The polymer bases for each of these layers can be selected such that co-crosslinking of the polymers results in a monolithic structure. The use of incompatible polymers may result in an image that is puckered, distorted and/or a molded product that is less durable.

The mold surface with the polymers is generally allowed to cure. The length of curing may depend on the types of various polymer bases present in the different layers and the catalyst used. Preferably, the structure on the mold is allowed to cure for at least several hours, more preferably at least overnight and even more preferably for at least about 24 hours.

The intermediate layers, the color gel coat, and the molded structure are generally left on the mold surface in order for the crosslinking to occur. During this period, the polymers in each of the layers generally become crosslinked. The co-crosslinking of the polymers in all the layers thus, forms a monolithic-type structure with an image that is particularly durable due to protection afforded by the crosslinked clear outer gel coat.

The crosslinked product can be removed from the mold surface using conventional techniques in the art. Generally the molded product comes off the mold surface, due to the presence of the mold release agent, when a small section is pried away.

In some embodiments, the image in the molded product is preferably crosslinked, visible through and protected by a crosslinked clear gel coat. In other embodiments, the image is crosslinked and is part of the outer layer of the molded product.

The molded product with the image, once removed from the mold surface, may be used in a suitable manner depending on the nature of the product. If the molded product is a boat, for example, the product may be processed in a conventional manner such as incorporating an engine, windshield, seating and the like.

In this way, the use of the process for providing a decorative transfer is achieved at a minimum of expense. Decorative transfers are relatively easy to print and applying an image with fewer steps is particularly advantageous.

C. Molded Products

The methods described herein can be used to produce a variety of molded products. The molded products include an ink film describing a desired image. In some embodiments, the ink film is protected by a clear gel coat. The molded products can include one or more decorative transfers, a color gel coat and generally an additional molded structure. The color gel coat generally includes a catalyst that initiates crosslinking of the color gel coat and unsaturated polymers in the decorative transfers. The image in the molded product, preferably, includes an ink that has a crosslinked polymer base.

Molded products as described herein include products that contain decorative transfers, for example, boats, snowmobiles, water skis, jet skis, recreational vehicles, gel coat parts of automobiles, bathtubs, showers, tabletops, furniture and the like. Molded products, as referred to herein, also include parts of molded products, i.e. front end, back end, engine cover, top etc., that will ultimately be used in combination with other parts to make the desired product.

The images included in the molded products can include complex multi-color images, informative and/or decorative images and lettering. The images may also include blocks of color, for example, stripes, geometric shapes, and the like. The blocks of color may have only one color. Alternatively, a plurality of color blocks may be placed adjacent to each other.

The molded products described herein can be made using an open mold process or a closed mold process. Molded products and/or parts made using an open mold process have one surface, i.e. the exterior surface, that was in contact with a mold surface during the molding process. Molded products and/or parts using the closed mold process, however, generally have two surfaces, i.e. the interior surface and the exterior surface, that were in contact with a mold surface during the molding process.

Figure 7:
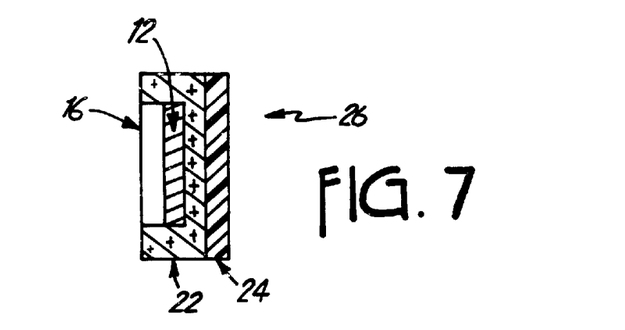
FIG. 7 is a cross-sectional view showing a molded product removed from the mold surface. The molded product includes the image of the decorative transfer of FIG. 1.

In an embodiment illustrated in FIG. 7, the molded product 26 includes the decorative transfer 10. The first intermediate layer 14 that includes an ink film is embedded between the clear gel coat 16 and the color gel coat 22. The molded structure 24 is overlayed on the color gel coat 22. The image, when made with crosslinkable ink, is generally crosslinked due to the catalyst present in the color gel coat.

The molded product 26, as shown in FIG. 4, generally is rigid and after removal from the mold 20 is ready for use and/or additional assembly of fabrication operations. The image in the molded product is visible through and protected by the clear gel coat that has a hard abrasion-resistant surface.

Figure 8:
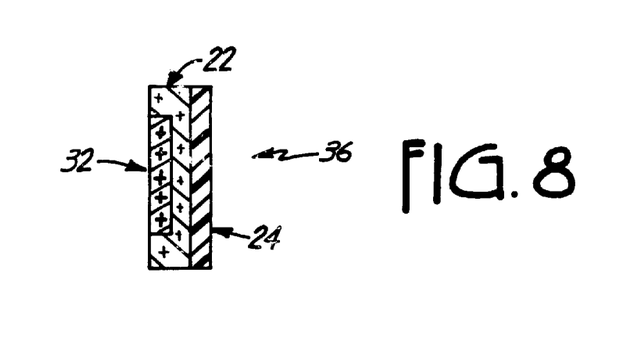
FIG. 8 is a cross-sectional view showing a molded product removed from the: mold surface. The molded product includes the intermediate layer of the decorative transfer of FIG. 2.

Molded product 36, shown in FIG. 8, includes a crosslinked image of intermediate layer 32 from decorative transfer 30, a color gel coat 22 and a molded structure 24. The image, in this embodiment, is the crosslinked outer layer.

In preferred molded products, all of the polymer bases, including the polymer base of a clear gel coat, if used, the polymer base of the inks, the color gel coat and the support resin of the molded structure generally have been co-crosslinked by exposure to a catalyst for a suitable time. The image in the molded product, preferably, is not distorted, puckered or otherwise misaligned. The molded products described herein have monolithic structures and have particularly durable images due to the crosslinked inks and/or protection afforded by a clear outer gel coat layer. The images have exceptional exterior durability, abrasion resistance, impact resistance and water immersion resistance.

EXAMPLES

Example 1

Decorative Transfer With Tack-free Inks

This example illustrates a method for making a decorative transfer using tack-free inks and a tacky clear gel coat.

The CCP 953 WJ 300 series of polyester gel coats were purchased from Cook Composites and Polymers, Kansas City, Mo. To these gel coats, about 5 to about 10 percent by weight of 9630 polyester thinner from Nazdar Company, Inc., Shawnee, Kans. and optionally about 2 percent or less by weight of ML-520 flow promoter from Cudner & Connor Co., Chicago, Ill. were added to form a screenable ink. The polyester gel coat, the solvent and the flow agent were mixed together prior to use in screen printing. Mixing was performed with a conventional paint shaker. Additional solvent and flow agent were added to obtain the desired screenability of the inks. Additional solvent were determined to be necessary if premature drying of the inks occurred on the screen.

Special opaque colors and shades were produced by blending appropriate quantities of CCP 953 WJ 300 series colors together. For example, a gray color was produced with a blend of about 2.0 percent by weight of 953 WJ 300 series black and about 98.0 percent by weight of 953 WJ 301 series white. Different shades of gray can be obtained by varying the weight percent of the black and the white gel coats.

Some inks were also made by using a neutral clear gel coat purchased from Squiggle Tool Co., Maple Grove, Minn. To the neutral gel coat, liquid pigment concentrates purchased from American Colors, Elberta, Ala. were added. Liquid pigment concentrates were added to the neutral gel coat to produce a screenable, opaque color. The amount of liquid pigment concentrate used ranged from about 5 percent by weight to about 30 percent by weight based on the desired color. Liquid pigment concentrate was added to the neutral gel coat and mixed using a conventional paint shaker.

The screening equipment included conventional off contact screening equipment, vacuum tables, screen fabrics, stencils, and squeeges. The inks were placed onto the screen and squeeged to form the image. The inks with additional solvents and flow agents had improved ink flow characteristics and reduced tendency for drying in the screen. The decorative transfers were air dried at room temperature or oven dried in a convection oven at temperatures ranging from about 150° F. to about 250° F. to remove solvents from the inks.

In order to make a 3 color decoration, the first color was applied on the water slide carrier sheet using conventional edge registration techniques to register the first color in a specific area on the carrier. After the first color dried, the next color was applied with a second screen using edge registration to position the second color in its proper location on the water slide carrier sheet. After the second color dried, the next color was applied with a third screen design using registration to position the third color in its proper location on the sheet.

After all the colors have been applied and dried to remove any residual solvents and leave the screened inks tack free, a clear gel coat was applied to the ink film. A clear polyester gel coat (CCP 942-XA-220) from CCP, Kansas City, Mo. was precision coated onto the ink film on the backing to a wet coat thickness of about 0.010 inches to about 0.015 inches.

The clear gel coat was allowed to dry for about 60 minutes at about 150° F. The gel coat developed a tacky adhesive-like characteristic when tested with finger pressure. A protective release liner purchased from Flexcon Materials, Spencer, Mass. was placed over the tacky clear gel coat. After the protective release liner was laminated to the tacky surface, the decorative transfer was die cut to trim away excess material and stored for future use.

Example 2

Decorative Transfer With Tacky Inks

This example illustrates a method of making decorative transfers using tacky inks.

A color gel coat 953 WJ 301 was purchased from CCP, Kansas City, Mo. and screen applied onto the inner surface of a backing sheet. The color gel coat was allowed to dry for about 15 to about 30 minutes.

When the color gel coat was dry, tacky inks were used to create images on the dried color gel coat layer. The image created was a single block of color corresponding to a stripe in the finished molded product.

To make the tacky inks, marine clear gel coat 942 XA 220 was purchased from CCP, Kansas City, Mo. and liquid pigment concentrates were purchased from American Colors, Elberta, Ala. The tacky inks were made by adding the appropriate color concentrates to the marine clear gel coat with stirring and/or mixing until color dispersion was uniform. The amount of pigment that was added to the marine clear gel coat varied between about 10 percent by weight and about 30 percent by weight depending on the desired color, translucency and opaqueness. Additionally, a silicone flow agent ML 520 flow promoter purchased from Cudner and O'Connor Co., Chicago, Ill. was added in some cases to improve coatability and flowout of the gel coat. Ultraviolet light absorber Cyasorb UV-400 was added, if desired, to the inks. The addition of the ultraviolet light absorber did not affect the tackiness of the inks.

Transparent and metallic colors were produced by blending appropriate quantities of CCP 942 XA 220 clear polyester gel coat with liquid pigment concentrates purchased from American Colors, Elberta, Ala. and metal pigments purchased from Alcoa, Bauxite, Ariz. A transparent metallic red was made by using about 90 percent by weight of 942 XA 220 clear polyester gel coat, about 8 percent by weight of red concentrate liquid pigment, and about 2 percent by weight of aluminum powder.

The tacky ink solution was precision coated onto a backing that had been pre-coated with a dry tack-free color gel coat layer. The coated tacky layer was allowed to dry for about 30 minutes to about 60 minutes at 150° F. When the coated ink layer was dry and had acquired the desired tackiness, a protective release liner, as described in Example 1, was placed over the coated ink film. The coated decorative transfer was die cut to trim away excess material and stored for future use.

Example 3

Application of Decorative Transfer in a Boat

This example illustrates the application of a decorative transfer in a boat mold.

A decorative transfer was made as described in Example 1. The mold was coated with the wax release agent Finish Kare Hi Low™ relase wax, Composites One, Lino Lakes, Minn. and allowed to air dry for several minutes. The wax coating was polished to a high gloss with a soft clean cloth.

The protective release liner of the decorative transfer in Example 1 was removed by peeling the liner away from the tacky resin. Removal of the protective release liner exposed the tacky resin.

The tacky resin of the decorative transfer was positioned over the mold surface and laminated with a squeegee to minimize trapped air at the mold surface/decorative transfer interface.

When the transfer was applied and firmly attached to the mold surface, water was applied until the backing paper was completely wet. The water was allowed to penetrate into the paper to dissolve the water soluble coating. The carrier was removed leaving only the intermediate layers of the decorative transfer on the mold surface.

A pigmented white polyester gel coat color (953-WJ-301 white) purchased from Cook Composite and Polymers, Kansas City, Mo. was mixed with about 1.0 percent by weight, 3.0 percent by weight or 6.0 percent by weight of the catalyst Lupersol™ DHD-9 methyl ethyl ketone peroxide. The catalyzed white gel coat was sprayed over the intermediate layers and also the mold surface area surrounding the intermediate layers to a wet coat thickness of about 0.125 inches. The whole composition was allowed to set for about 25 minutes to about 30 minutes prior to addition of the lamination schedule.

A molded structure of polyester resin/glass mat lamination was applied to complete the component construction. A solution of Reichold polylite polyester resin from Cook Composites and Polymers, Kansas City, Mo., catalyzed with DHD-9 MEKP (red dye) MEK 46736 from Advanced Plastics, Nashville, Tenn., was applied to the white gel coat followed by lamination of glass mat. The red dye in the catalyst was added to provide a visual aid to determine thickness and coverage of the applied coatings. The lamination schedule included one layer of angel hair fiberglass, one layer of 20 ounce core Mat, and 3 layers of continuous strand fiberglass mat purchased from Owens-Corning Fiberglas. A coating of resin was applied prior to application of each layer of the fiberglass/core mats. This lamination schedule resulted in a molded structure of between about ¾ inch and about one inch. The end use of the molded product determined the desired thickness and strength and thus, the lamination schedule. The whole composition on the mold surface was allowed to cure for between about 12 to about 24 hours at room temperature. The white gel coats with 3.0 percent by weight of catalyst or 6.0 percent by weight of catalyst were able to catalyze the crosslinking of the polymers from the decorative transfer. The white gel coat with 1.0 percent by weight catalyst resulted in a rubbery product due to insufficient catalysis of the polymers derived from the decorative transfer.

The fabrication of the molded component was complete at this point. The finished part was removed from the mold surface using conventional techniques. When the molded component was removed and viewed in plan view, the image was incorporated into the molded product surrounded by a colored (white) gel coat. The image was smooth to the touch, did not protrude from the surface and was at the same height as the surrounding surface. The molded component was used to continue the assembly process.

Although the present invention has been described with reference to preferred embodiments, workers skilled in the art will recognize that changes may be made in form and detail without departing from the spirit and scope of the invention.

What is claimed is:

1. A process for providing a decorative transfer in a molded product comprising applying a decorative transfer to a mold surface, the decorative transfer comprises a backing, one or more intermediate layers comprising a crosslinkable ink film and a crosslinkable tacky resin, the one or more intermediate layers disposed on the inner surface of the backing, placing the tacky resin in contact with the mold surface, removing the backing, applying a gel coat containing a catalyst in contact with the decorative transfer, whereby the catalyst catalyzes and causes crosslinking of the gel coat, the ink film and the tacky resin.

2. The process of claim 1 wherein the decorative transfer comprises two intermediate layers, the first layer comprising an ink film on the inner surface of the backing and the second layer comprising a clear gel coat layer over the ink film, the clear gel coat layer comprising the tacky resin that is contacted with the mold surface.

3. The process of claim 2 wherein the clear gel coat layer comprises an unsaturated polyester resin.

4. The process of claim 2, wherein the ink film comprises an unsaturated polyester resin.

5. The process of claim 2 wherein the clear gel coat layer and the ink film both comprise unsaturated polyester resin.

6. The process of claim 2 wherein the ink film comprises a substantially tack-free resin.

7. The process of claim 1 wherein the decorative transfer further comprises a protective release liner over the tacky resin and the process further comprises removing the protective release liner prior to applying the decorative transfer to the mold surface.

8. The process of claim 1 further comprising applying water to the backing to remove the backing.

9. The process of claim 1 wherein the gel coat comprises a color gel coat.

10. The process of claim 4 wherein the catalyst initiates the crosslinking of the gel coat in contact with the decorative transfer, the clear outer gel coat and the ink film.

11. The process of claim 9 further comprising forming a molded structure over the color gel coat, the structure comprising one or more substrates and one or more layers of crosslinkable support resin.

12. The process of claim 11 wherein the one or more substrates and the one or more layers of support resin are layered to form a molded structure upon crosslinking.

13. The process of claim 12 wherein the support resin comprises a catalyst.

* * * * *